United States Patent [19]

Heil et al.

[11] Patent Number: 4,501,664
[45] Date of Patent: * Feb. 26, 1985

[54] METHOD AND APPARATUS FOR TREATING ORGANIC WASTEWATER

[76] Inventors: Richard W. Heil, 30 Arthur Ave., Clarendon Hills, Ill. 60514; Thomas A. Rose, 351 S. Waiola Ave., LaGrange, Ill. 60525

[*] Notice: The portion of the term of this patent subsequent to Nov. 15, 2000 has been disclaimed.

[21] Appl. No.: 550,906

[22] Filed: Nov. 10, 1983

Related U.S. Application Data

[63] Continuation-in-part of Ser. No. 359,585, Mar. 18, 1982, Pat. No. 4,415,452.

[51] Int. Cl.³ .............................................. C02F 3/20
[52] U.S. Cl. ..................... 210/614; 210/604; 210/626; 210/788; 210/195.3; 210/197; 210/218; 210/220
[58] Field of Search ............... 210/604, 608, 614, 626, 210/627, 788, 199-202, 195.3, 218, 220, 252, 255, 212, 787

[56] References Cited

U.S. PATENT DOCUMENTS

| | | | |
|---|---|---|---|
| 3,560,376 | 2/1971 | Heil | 210/220 |
| 3,725,258 | 4/1973 | Spector et al. | 210/614 |
| 3,772,187 | 11/1973 | Othmer | 210/627 |
| 3,997,437 | 12/1976 | Prince et al. | 210/220 |
| 4,130,481 | 12/1978 | Chase et al. | 210/614 |
| 4,171,263 | 10/1979 | Roberts et al. | 210/626 |
| 4,238,338 | 12/1980 | Kinzer | 210/220 |
| 4,306,969 | 12/1981 | Tamura et al. | 210/220 |
| 4,405,456 | 9/1983 | Kinzer et al. | 210/220 |
| 4,415,452 | 11/1983 | Heil et al. | 210/614 |

FOREIGN PATENT DOCUMENTS 56-42323 10/1981 Japan .................................. 210/788

*Primary Examiner*—Benoit Castel
*Attorney, Agent, or Firm*—McWilliams, Mann, Zummer & Sweeney

[57] ABSTRACT

A method and apparatus for achieving high quality treatment of organic waste water (both domestic and industrial types), which can also be used to treat organically contaminated water supplies or to reduce hazardous organic wastes (cyanides, PCBs, etc.)

The apparatus operates at elevated pressures (up to about 35 psig), at high levels of dissolved oxygen (over 5 PPM), and at high concentrations of activated sludge (about 10,000 mg/l, MLSS). It consists of four separate process compartments (2 aeration compartments, a separator and a clarifier) which are contained within three vessels or alternatively in two vessels. The process compartments are linked in series by passageways and by piping and are maintained at a uniform pressure using a common manifold.

The process is designed for simplicity of operation, compactness, and maintenance by a single part time attendant.

11 Claims, 2 Drawing Figures

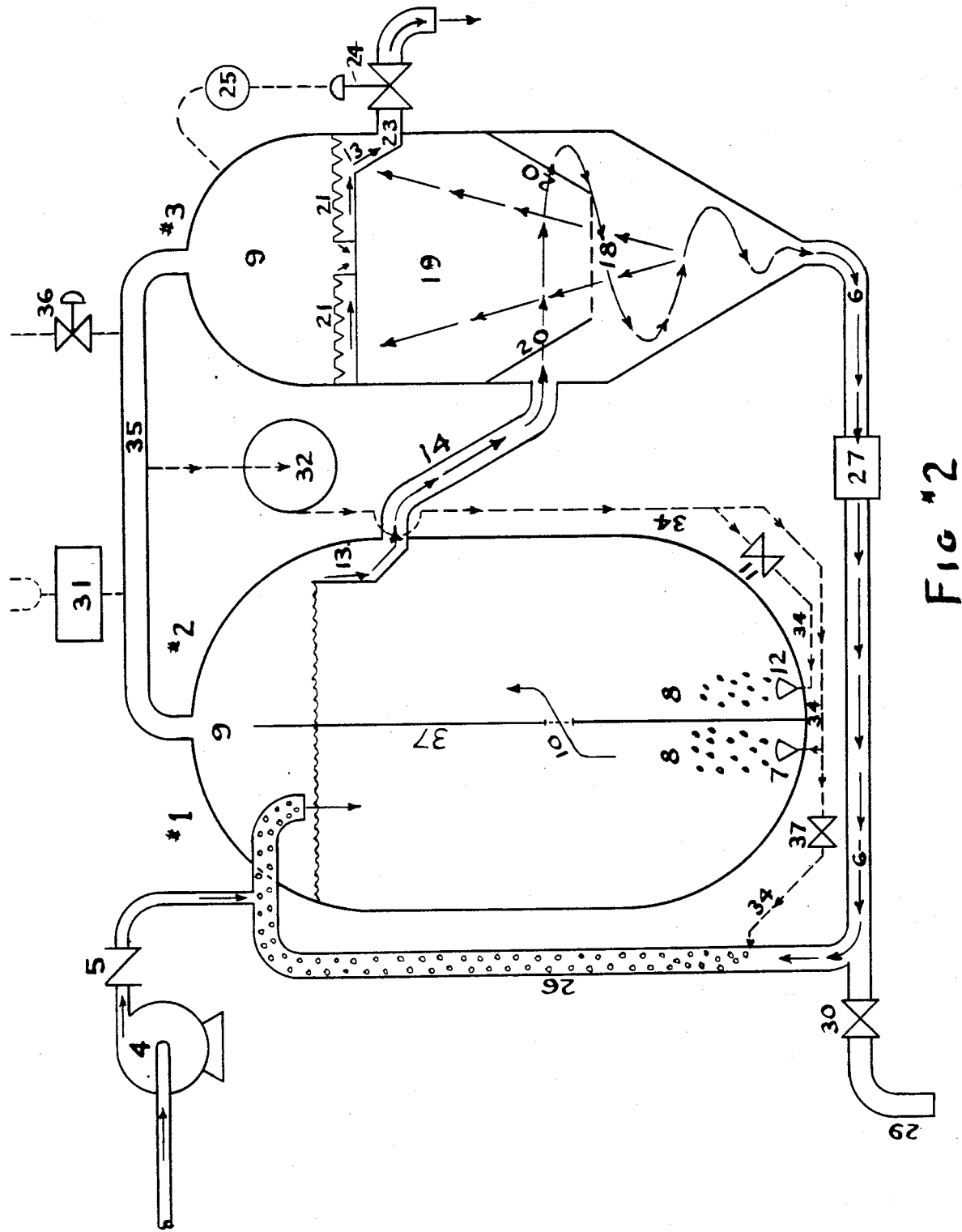
FIG #2

METHOD AND APPARATUS FOR TREATING ORGANIC WASTEWATER

This application is a continuation-in-part of our U.S. patent application Ser. No. 359,585, filed Mar. 18, 1982, now U.S. Pat. No. 4,415,452, granted Nov. 15, 1983.

PRINCIPLES UPON WHICH THE INVENTION IS BASED

Parameters for the invention derive from experience gained in operating a 43 year old activated sludge plant that handles peak wastewater flows of up to 1440 MGD (million gallons per day). In 1971, just prior to commencement of a vigorous program to optimize quality, the treated effluent for the plant contained an average $BOD_5$ of 23 mg/liter, 30 mg/liter suspended solids and 11.8 mg/liter ammonia. Since then, treatment quality has been steadily improved. Last year (1981), the treated effluent contained a residual impurity of only 6 mg/liter $BOD_5$ 6 mg/liter suspended solids and 1.4 mg/liter ammonia.

Lessons derived thereby are as follows:

(1) Maintain a minimum dissolved oxygen (D.O.) content of 4 mg/liter throughout the treatment system. (In our invention, pressurization enhances oxygen transfer and helps maintain high levels of D.O.)

(2) Avoid degradation of activated sludge by minimizing its retention time in the clarifier. (In our invention, the sludge floc is removed from the separator/clarifier vessel within eight minutes.)

(3) Food to micro-organism ration (F:M ratio) should be kept under 0.2, wherein "food" is computed as pounds per day of wastewater $BOD_5$, and "micro-organisms" are computed as total dry pounds of mixed liquor suspended solids (MLSS). To stay within that ratio, mixed liquor in the 43 year old plant is maintained at a concentration of 2500 mg/liter MLSS during the summer, and upwards of 3500 mg/liter MLSS in the winter when bacterial action is slow. (Our invention is designed to safely handle 10,000 mg/liter MLSS.)

(4) Provide ample mixing action to enhance assimilation of the waste by the floc, restricting sedimentation of solids to the clarifier units. (In our invention, the location of air diffuser heads, the shape of the process vessels, the rate of sludge return, and piping arrangements combine to provide excellent mixing.)

(5) Prevent excessive turbulence so as to avoid tearing the fragile bacteria floc. (In our invention there is a gentle gravity flow between the three process vessels. The only place in the system with substantial turbulence is in the sludge return pump.)

In summation, we learned from the old treatment plant that: "high quality biological treatment requires a favorable environment wherein useful organisms proliferate and undesirable types regress."

EXISTING LIMITATIONS IN TREATMENT FACILITIES

In theory, the size requirement of an activated sludge aeration tank is inversely proportional to the concentration of a mixed liquor. In other words, if an aeration tank is designed to operate at a concentration of 5000 mg/liter MLSS instead of 2500 mg/liter, its size can be reduced by half and still have the same capacity. Due to certain practical limitations however, it is extremely difficult to operate at concentrations about 4000 mg/liter. The problems have been:

(a) Poor Oxygen Transfer Efficiency:

The oxygen demand of liquor concentrations higher than 4000 mg/liter MLSS usually exceed the capacity of the aeration system. The two exceptions to this limitation have been pure oxygen systems (which offer good transfer efficiency but are plagued with mechanical problems) and pressurized aeration systems (which tend to be difficult to regulate and service, as per experience with U.S. Pat. No. 3,560,376 by R. W. Heil). Our invention rectifies this problem with a simplified pressure system that is self regulating and easy to service.

(b) Vulnerability to Upset:

Conventional clarifiers are easily upset when they are fed high concentrations of mixed liquor. The sludge blanket may rise too fast and/or density currents may sweep floc over the effluent weir.

This vulnerability to upset is due to design compromise wherein three (not altogether compatible) functions are performed in the clarifier:

1. flocculation of the micro-organisms.
2. separation and removal of the effluent.
3. Concentration and return of the micro-organisms.

Performances of all these functions within one compartment necessitates use of a relatively large surface area and substantial holding capacity. Above all, the inventory of solids (micro-organisms) must be managed with great care. If not retained long enough, the return sludge will be dilute and thus too voluminous for the system to handle. However, if the solids are retained too long, the dissolved oxygen will be depleted and the micro-organisms deteriorate.

In our invention, vulnerability to clarifier upset is resolved by handling each of the above functions in separate specialized compartments.

(c) Voluminous Clarifier Sizes:

To function properly, conventional clarifiers require substantial depth and surface area. Much of the volume provided is used for dissipation of density currents and for transition space between function zones. The small diameter gravity clarifiers are especially plagued by poor settling performance (not enough volume to dissipate density currents). Large clarifiers perform better but do not lend themselves to a pressurized treatment system, being too difficult and too expensive to enclose. As a result, most pressurized aeration systems use an open flotation tank for separation of sludge and effluent (as in U.S. Pat. No. 3,444,076 by Sekikawa et al.) flotation separators have the advantage of compactness, low capital cost, quick separaton and high solids concentration. However, upon release of a pressurized mixed liquor to atmospheric conditions the explosive release of dissolved gas tends to tear-up the organic floc and produce a muddy effluent.

Our invention solves these problems with a two stage pressurized separator/clarifier unit.

(e) Inadequate Monitoring of MLSS

To maintain a proper concentration of activated sludge in the aeration tanks, a treatment plant operator needs to know his mixed liquor suspended solids (MLSS). With this information, he can determine the rate at which the sludge should be wasted to maintain a proper concentration. If his waste rate is too low, the solids concentration will become excessive and overflow the clarifier. If too many solids are wasted, treatment quality declines because of insufficient bacteria to assimilate the waste.

The operator can draw a sample and determine the MLSS by laboratory analysis, but the procedure is slow and requires considerable skill and equipment. Alternatively, there are various commercial density meters that can provide an approximation of the MLSS on a continuous basis. Most of them employ some means of penetrating the MLSS with an energy source (sonic waves, light beams, gamma rays, etc.) and measuring the attenuation. Unfortunately, such meters require frequent calibration, their cost is high and their reliability is low.

In our invention we utilize the rheological properties of the sludge to obtain an instant, close approximation of MLSS. Unlike existing density meters, the rheological method is low in first cost and upkeep.

Rheologically, activated sludge is a "thixotropic pseudo-plastic". Simply put, its flow behavior is more like tooth paste than water. The term "thixotropic" indicates it stiffens or gels when at rest, but breaks down and becomes fluid when subjected to agitation or high shear stress. In our invention, the sludge is kept in constant motion (offering no opportunity for gel) therefore thixotropy can be ignored.

As the MLSS concentration of activated increases, it becomes increasingly resistive to flow. If the sludge is pumped into a small tube of fixed length and diameter, and maintained at a constant pressure differential; its velocity will be an inverse function of MLSS concentration. When velocity (ordinate) is plotted on a graph as a function of MLSS (abscissa), the resulting curve is nearly horizontal at low concentrations of MLSS, descending in a downward spiral as the MLSS increases. At some critical concentration, flow velocity will cease altogether. If the SVI (sludge volume index) of the sludge is relatively constant, the graph is dependably repeatable.

With such a graph, a treatment plant operator can readily determine his MLSS simply by reading a magnetic flow meter. Furthermore he need concern himself with only two velocity limits, minimum (indicating upper permissible concentration), and maximum (indicating the thinnest permissible concentration).

Due to very high dissolved oxygen levels, our invention provides unusually low and fairly uniform SVI's (ranging from about 40 to 60). Thus the relationship between rheological behavior and MLSS concentration is dependably consistent. Furthermore, the only instrument or sensor required for our solids monitor is a magnetic flow meter, and experience has shown such meters to be one of the few instruments used in pollution control that can give maintenance free performance in a troublesome fluid like sewage sludge.

DESIGN OBJECTIVES

The object of our invention is to provide a treatment process for organic wastewater that is compact (relative to capacity), simple to construct and operate, is energy efficient, requires little maintenance, and achieves tertiary quality.

To accomplish this, all major components of the apparatus are pressurized equally (up to about 35 psig). For ease of maintenance, all moving parts are placed outside the pressure vessels, and the interior of the vessels are clear of anything that can clog or foul with slime growth. An air diffuser head in each of the aeration vessels provides mixing and promotes oxygen transfer.

The size of the clarifier unit has been minimized by providing a unique two tier cyclone separator that utilizes density currents to affect rapid centrifugal separation. Solids are drawn from the bottom (as return sludge) and the clear centrate is displaced by gravity into the vortex, where it flows upward into the top tier for final clarification. Detention time for the sludge is only eight minutes, thereby eliminating the risk of oxygen depletion. Of key importance, the separator-clarifier vessel's compact size substantially reduces the cost for pressurized containment.

Within the entire process, there is only one component that causes enough turbulence to damage the sludge floc, namely the return sludge pump. However, due to its location in the process system, the floc has ample opportunity to recover. It therefore enters the separator unit in excellent condition, ideal for effecting rapid separation.

The rate of return sludge in our invention (300% of the design capacity flow) is unusually high; however use of a constant high return flow provides a number of advantages:

(1) Aids in maintaining a gentle cyclone action within the separator unit.

(2) Minimizes sludge detention time, thus reducing oxygen depletion in the clarifier.

(3) Minimizes the amount of sludge thickening needed to sustain high MLSS concentrations.

(4) Self regulates the thickening and removal process, thereby eliminating need for costly sludge blanket control.

(5) Promotes better mixing action.

BRIEF DESCRIPTION OF THE DRAWINGS

FIGS. 1 and 2 show two alternative means for connecting the four process compartments in series.

DETAILED DESCRIPTION

Figure 1:
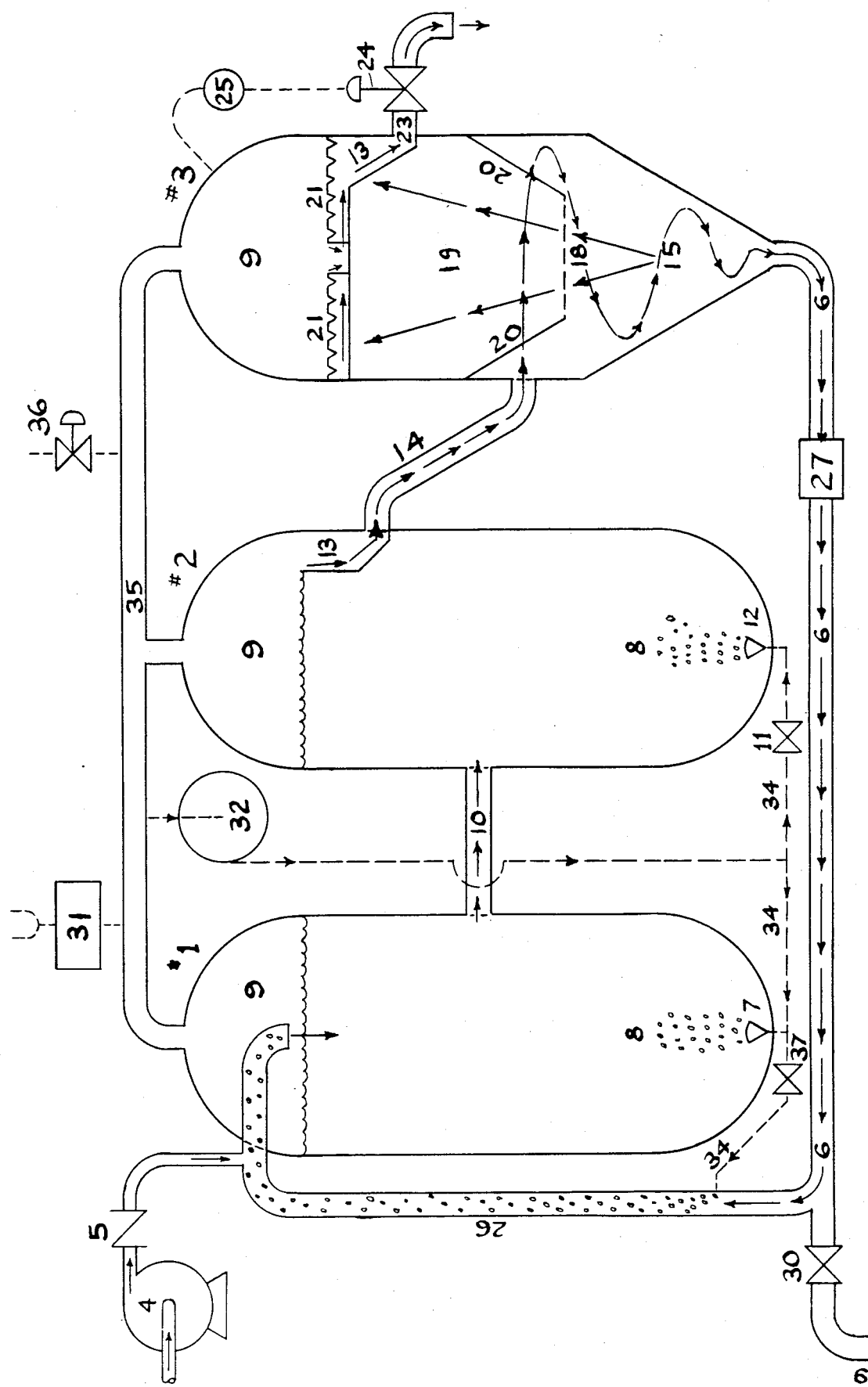

Referring now to the drawing of the apparatus, all standard components shown, such as the valves, pumps, blower, air compressor assembly, liquid level controller and piping (which are not described in the claims) are conventional and their uses and functions are well known in the art. Reference may also be made to our copending U.S. patent application Ser. No. 359,585, filed Mar. 18, 1982, now U.S. Pat. No. 4,415,452 (the disclosure of which is incorporated herein by this reference).

The configurations shown in both FIG. #1 and FIG. #2 have been sized for a sewage strength of 200 mg/l $BOD_5$ and a treatment rate of 12,000 gallons per day (gpd). The mixed liquor concentration will be maintained at about mg/l SS, for a food to micro-organism (F:M) ratio of about 0.20. Sizing and dimensions are only approximate and could be scaled upward or downward, depending on the strength and quantity of sewage to be treated.

Referring to FIG. 1, organic wastewater that has been screened and degritted (or macerated) is pumped continuously or intermittently (as needed) into the first stage aeration compartment (vessel #1) by means of a suitable single stage centrifugal pump 4, through a suitable flap gate check valve 5 into the top of air lift or pump 26, where it intermixes with the return sludge and is discharged into aeration tank #1.

The mixed liquor (wastewater and return sludge) in compartment #1 is dosed with a continuous stream of air bubbles 8 rising from aerator head 7 located in the bottom of the compartment of vessel #1. The diffused air bubbles 8 become attached to the sludge floc and bouy it upward to the interface of the vessel #1 air dome 9, where the floc is further saturated with air before sinking downward along the walls of compartment of vessel #1.

Oxygen transfer to the mixed liquor occurs through diffusion of air bubbles from aerator head 7 into the liquor and from a rolling interface of the liquor withthe air dome 9. Elevated pressure within the aeration compartment (preferably about 35 pounds per square inch gauge) provides an extremely efficient driving force for transfer of oxygen into the mixed liquor. The mixed liquor within the compartment of vessel #1 cycles continuously upward above the diffuser head 7, and downward near the perimeter of the compartment defined by vessel #1, eventually flowing out (by gravity) through conduit 10 into the aeration compartment defined by vessel #2.

As receiving unit for sewage influent, the first stage aerator compartment (of vessel #1) sustains the highest oxygen demand. After being partially satiated in the first stage, the oxygen demand of the mixed liquor tapers off sharply in the second stage unit (the compartment of vessel #2). Accordingly, we have provided an adjustable throttle valve 11 (that may be of any conventional type) on air supply line 34 to air diffuser head 12 in vessel #2. Whereas full air flow to diffuser head 7 is to and does create a vigorous boil in the compartment of vessel #1, the throttled air supply to diffuser head 12 can be and is adjusted to produce only a gentle rolling action that enhances flocculation yet is sufficient to satiate oxygen demand. When the sludge floc finally leaves the aeration compartment defined by vessel #2, it is strong and dense, settles easily, and has virtually assimilated all the organic waste in the wastewater.

The level of mixed liquor in both the aeration compartments of vessels #1 and #2 is controlled by the overflow/transfer box 13 (located in the compartment of vessel #2), from whence the fully aerated mixed liquors enters conduit 14 and flows into the cyclone separator compartment 15 of vessel #3 in tangent relation to the cylindrical wall of vessel #3 defining compartment 15, and in between same and the annular, tubular cone 20 that is suitably mounted in vessel #3. The differential head between liquid levels in vessels #2 and #3 and the discharge level of the liquor at the outlet of conduit 14 imparts a velocity head to the liquor flow in cyclone separator compartment 15. The mixed liquor spins in a discending spiral down to and down along the wall of the lower or bottom cone of vessel #3, as disclosed in our U.S. patent application Ser. No. 359,585, now U.S. Pat. No. 4,415,452. The floc (being heavier than water) is spun to the outside, the centrate (consisting of water and pin floc) is displaced to the center (the vortex of the cyclone). The heavy sludge floc descends to the bottom of the cone where it is continuously drawn off into suction line G leading to air lift pump 26.

Centrate from the cyclone vortex operating in compartment 15 flows up through opening 18 at the bottom of the upper tubular, annular cone 20 and flows into the settling compartment 19 of vessel #3 (that is separated from separator compartment 15 by cone 20). In the settling compartment 19, the pin floc deposits out along the sides of the upper cone 20 and slides downward through the opening 18 into the lower chamber defined by compartment 15 and is withdrawn with the return sludge into suction line 6. The resulting effluent spills over the diagrammatically illustrated V-notch weirs into four convention radial draw-off troughs 21, and thence into a collector pocket 13, connected to a discharge pipe 23, then past valve 24, which is regulated by a conventional liquid level controller 25, and dischage from vessel #3.

Return sludge from vessel #3 is drawn through line 6 by an air lift pump 26 and pumped thereby back into aeration compartment #1. Pump 26 is designed for a 300% volume of return sludge (300% of treatment flow capacity). In the specific example shown on the drawing, the design capacity of the return sludge pump is (12,000 gpd)×(300/100)=36,000 gpd which is 25 gpm (gallons per minute). The static head against which it pumps is relatively constant, namely the elevation difference between the crest of effluent in the weirs 21 in vessel #3 and the top of air lift 26, plus a small dynamic head loss in pipe 6 pump 26.

Supply air for the aeration bubbler heads 7 and 12 and air domes 9 of all vessels 1, 2, and 3 is provided by a suitable rotary compressor 31 suitably connected to manifold 34 and capable of achieving pressures of up to about 35 psig (the preferred operating pressure in manifold and domes 9 is about 35 psig). In addition to a low volume of fresh supply air from compressor 31 that is thereby provided the system, there is a high volume of recycle air provided from air manifold 35 to diffuser heads 7 and 12 via suitable blower 32 and the feed lines 34. Suitable blower 32 is suitably connected between manifold 35 and feed lines 34, as indicated. Because blower 32 draws previously pressurized air from manifold 35, it need develop only enough pressure to overcome the liquid head above aerator heads 7 and 12, about 4 psig, thus providing a suitable high volume air movement at a minimum expenditure of energy. The higher pressure rotary compressor (35 psig) accordingly need supply only enough volume of fresh air at the indicated pressure level to satisfy oxygen up-take plus a small allowance for wasteage.

Pressure manifold 35 provides for equalization of air pressure between all three pressure vessels #1, #2, #3, thereby creating a common atmosphere at the indicated pressure level within the process system in which the liquid can move by gravity flow without necessitating complex valve controls. Spent air in the system is exhausted through suitable pressure relief valve 36 which also is suitably set to regulate air pressure in the system at the indicated preferred pressure level.

The second feed line 34 is also connected through a valve 37 that is similar to valve 11 to supply air to the pump 26 to operate the latter as has been indicated.

Optimal mixed liquor concentration for the system is matinainted by means of wasting part of the return sludge through drain line 29 (to a holding tank for removal by a honeywagon, or to a digester unit). Said wasting is accomplished by suitably opening off-on valve 30 as needed once or twice a day to bleed off the surplus sludge.

The approximate mixed liquor concentration in the system is determined instantly by comparing readings of suitable magnetic flow meter 27 with a previously calibrated chart, wherein there is an equivalent MLSS in mg/l for each rate of flow.

Whereas air lift 26 rises against a fixed head (crest of effluent weir 21 to top of air lift 26), and is energized by a constant amount of air through valve 37 and line 34, the volume of sludge lifted (as measured at magnetic flow meter 27) becomes an inverse function of the return sludge solids in mg/l. (Simply put, the thicker the solids, the slower the flow).

By taking four or more samples of different return sludge concentrations, recording their meter readings and obtaining a lab analysis of the suspended solids concentration, a graph is produced by plotting the meter readings (ordinate) as a function of suspended solids (abscissa). The plot points will be interconnected with a curved line that can be used to extrapolate suspended solids from future meter readings.

The meter 27 measures only the return sludge suspended solids, not the mixed liquor suspended solids MLSS. However, there being a continuous fixed rate of return sludge (300% of influent design capacity), the MLSS itself will merely be ¾ of the return sludge SS. This calculation is slightly in error when the system is operating at less than design capacity, but will be adequate for control purposes.

The sludge wasting should be commenced when the magnetic flow meter 27 reaches its minimum allowable reading (indicating maximum allowable concentration of MLSS). Wasting is continued until the meter reading rises to the allowable maximum (indicating minimum allowable concentraton of MLSS), whereupon waste valve 30 is closed completely. The waste system can be either operated manually by the treatment operator, or automatically with a conventional micro-processor, programmed to respond to light signals from the magnetic flow meter.

Waste line 29 is on a tangential extension of return sludge line 6 in order to selectively extract grit and other heavy particles from the sludge recirculation system. Due to the upward curve in line 6 into pump 26, the heavy particles continue tangentially into the waste line draw-off stub 29, displacing any sludge floc that become trapped therein. Whenever valve 30 is opened, the captured grit flows out with the waste sludge.

In FIG. #1, the four compartments are contained in three equally pressurized vessels, and in FIG. #2 the four compartmeLnts are contained in two equally pressurized vessels. In FIG. #1, all three vessels are approximately four feet in diameter and ten feet in height.

In FIG. #2, the first vessel (which encloses aeration compartments #1 and #2), has a diameter which is approximately six feet, and a height which is ten feet. A flat partition 37 divides aeration compartments #1 and #2 (there being no pressure differential to resist between the two compartments). Flow from compartment #1 progresses to compartment #2 through a circular opening 10 in the partition 37.

The second vessel in FIG. #2 is identical to the third vessel in FIG. #1, containing both the separator compartment and the clarifier compartment.

The foregoing description and the drawings are given merely to explain and illustrate the invention and the invention is not to be limited thereto, except insofar as the appended claims are so limited, since those skilled in the art who have the disclosure before them will be able to make modifications and variations therein without department from the scope of the invention.

We claim:

1. The method of treating organic waste liquid with activated sludge comprising the steps of:
    establishing an enclosed continuous flow way for the organic waste liquid and the activated sludge in a mixed liquor form including several aeration chambers, and a separator chamber that are air pressurized to a predetermined pressure, that contain organic waste liquid and activated sludge, and that are consecutively connected in a continuous flow circuit through said aeration chambers, said separator chamber, and return flow to said one aeration chamber,
    mixing activated sludge and fresh organic waste liquid in said return flow,
    air-lift passing the return flow into said one aeration chamber adjacent the upper end thereof,
    dosing the body of the liquor of said one aeration chamber with air in diffused bubble form for flocculating and air saturation of the sludge,
    passing continuously from said liquor body a flow of the liquor to a subsequent of said aeration chambers having a second liquor body while diffusing air into said second body from the lower end of same for providing a liquor flow in which the flocculated sludge has assimilated the organic waste in the liquor flow,
    continuously passing in a gravity flow to said separator chamber the organic waste assimilated liquor flow, and establishing and maintaining in said separator chamber and in said organic waste assimilated liquor flow a cyclone separating action effecting centrifugal force and gravity induced settling out of the sludge flow thereof to provide said return flow, and a rising effluent centrate flow,
    continuously clarifying and discharging the centrate flow as tertiary quality effluent,
    and continuously pumping said return flow and returning same to the upper end of said one aeration chamber to effect said mixing and said first mentioned passing steps.

2. The method set forth in claim 1 wherein:
    said flow way is pressurized to have a uniform pressure of up to about 35 psig.

3. The method set forth in claim 2 wherein:
    said return flow is at a rate of approximately three hundred percent of said effluent centrate flow.

4. The method set forth in claim 2 wherein:
    the concentration of the liquor approximates 10,000 mg/liter of mixed liquor suspended solids.

5. The method set forth in claim 2 wherein:
    the flow of the liquor in said aeration chambers and in said cyclone separating action is quiescent.

6. The method set forth in claim 4 wherein:
    said pumping step is effected across a relatively constant differential head.

7. The method set forth in claim 6 wherein:
    the concentration of suspended sludge solids of said return flow step is monitored,
    and the return flow is sludge wasted to approximately maintain said liquor concentration.

8. Apparatus for continuously treating organic waste water with activated sludge as a mixed liquor, said apparatus comprising:
    first and second compartments disposed at substantially that same horizontal level respectively defining first and second aeration chambers,
    a vessel disposed substantially at said horizontal level and defining a separator chamber,
    said first and second compartment containing the liquor up to a predetermined horizontal level, therein in each, with said first compartment being in liquid flow communication with said second compartment below said predetermined level,
    said second compartment being connected to said vessel for gravity induced liquid flow of the liquor thereinto from said second compartment by conduit means extending from about said predetermined level of said second compartment to a lower level in said vessel for imparting a velocity head to the liquor flow in said separator, said vessel defining at its lower end a funnelling liquid flow discharge outlet and defining an internally centered frusto-conical divider baffle that depends in circumambient relation about said separator chamber from above to below said lower level thereof and defines at its lower end a liquid upflow port, said vessel above said baffle having means for effluent draw off therefrom, return conduit means connected between said vessel outlet and the upper end of said first compartment for returning sludge from said separator chamber to said first aeration chamber including pump means, inlet conduit means connected to said return conduit means adjacent said first aeration chamber for supplying organic waste water thereto, said first and second aeration chambers and said separator chamber being manifold connected at their upper ends and being commonly pressurized at a level in range of up to about 35 psig, first means for diffusing air into the liquor of said first aeration chamber at the lower end of said first aeration chamber, and second means for diffusing air into the liquid of said second aeration chamber at the lower end of said second aeration chamber, said liquor concentration in said first and second aeration chambers being about 10,000 mg/liter MLSS, said pump means and said return conduit means effecting the return of the sludge therethrough at a rate approximating three hundred percent of the effluent draw off flow, said pump means comprising:

said return conduit including an upright portion adjacent said first compartment and having an outlet that is adjacent said upper end of said first aeration chamber, and third means for diffusing air into said return conduit upright portion for inducing said sludge flow through said return conduit.

9. The apparatus set forth in claim 8 including means for monitoring the mixed liquor suspended solids factor of the return sludge from the rheological properties thereof, and means for wasting sludge from said return sludge for controlling the concentration therein of the such mixed liquor suspended solids.

10. The apparatus set forth in claim 8 wherein:

said first and second air diffusing means are air supplied from the air pressurizing said first and second aeration chambers and said separator chamber.

11. The apparatus set forth in claim 8 wherein:

said third air diffusing means is air supplied from the air pressurizing said first and second aeration chambers and said separator chamber.

* * * * *